United States Patent
Amano

[19]

[11] Patent Number: 5,835,022
[45] Date of Patent: Nov. 10, 1998

[54] KEYLESS ENTRY SYSTEM

[75] Inventor: Nobuhiro Amano, Ebina, Japan

[73] Assignee: Nissan Motor Co., Ltd., Yokohama, Japan

[21] Appl. No.: 629,038

[22] Filed: Apr. 8, 1996

[30] Foreign Application Priority Data

Aug. 2, 1995 [JP] Japan ................................. 7-197771
Aug. 3, 1995 [JP] Japan ................................. 7-198449

[51] Int. Cl.[6] ........................... G06F 7/04; G08C 19/00; B60R 25/00; E05B 49/00
[52] U.S. Cl. .................. 340/825.31; 340/825.3; 340/72; 307/10.2; 70/278
[58] Field of Search .................. 340/825.31, 825.34, 340/541, 542; 70/276, 277, 278; 235/380, 382.5, 382

[56] References Cited

U.S. PATENT DOCUMENTS

| | | | |
|---|---|---|---|
| 4,502,718 | 3/1985 | Sasaki et al. | 292/336.3 |
| 4,672,375 | 6/1987 | Mochida et al. | 340/825.31 |
| 4,700,186 | 10/1987 | Fujino et al. | 340/825.72 |
| 5,499,022 | 3/1996 | Boschini | 340/825.69 |
| 5,621,251 | 4/1997 | Yamazaki | 307/102 |

FOREIGN PATENT DOCUMENTS 60-037380  2/1985  Japan .

*Primary Examiner*—Michael Horabik
*Assistant Examiner*—Anthony A. Asongwed
*Attorney, Agent, or Firm*—Foley & Lardner

[57] ABSTRACT

When the opened condition of the either door is detected after the detection of the closed condition of all the doors and the detection of the locked condition of the driver seat door, the plurality of actuators are lock-driven even when the locked condition of the driver seat door is detected in the agreed judgment between the received code and the set code. A history flag setting unit is provided for setting the history flag in the locked condition of the door locking actuators of the driver seat and the opened condition of the either door of the vehicle. The keyless control unit judges whether or not the history flags are set when the door locking signal is inputted through the keyless remote control, and makes the condition locked, after having made the door locking actuators of all the seats unlocked once only when the history flag is set, and resets the history flag.

20 Claims, 9 Drawing Sheets

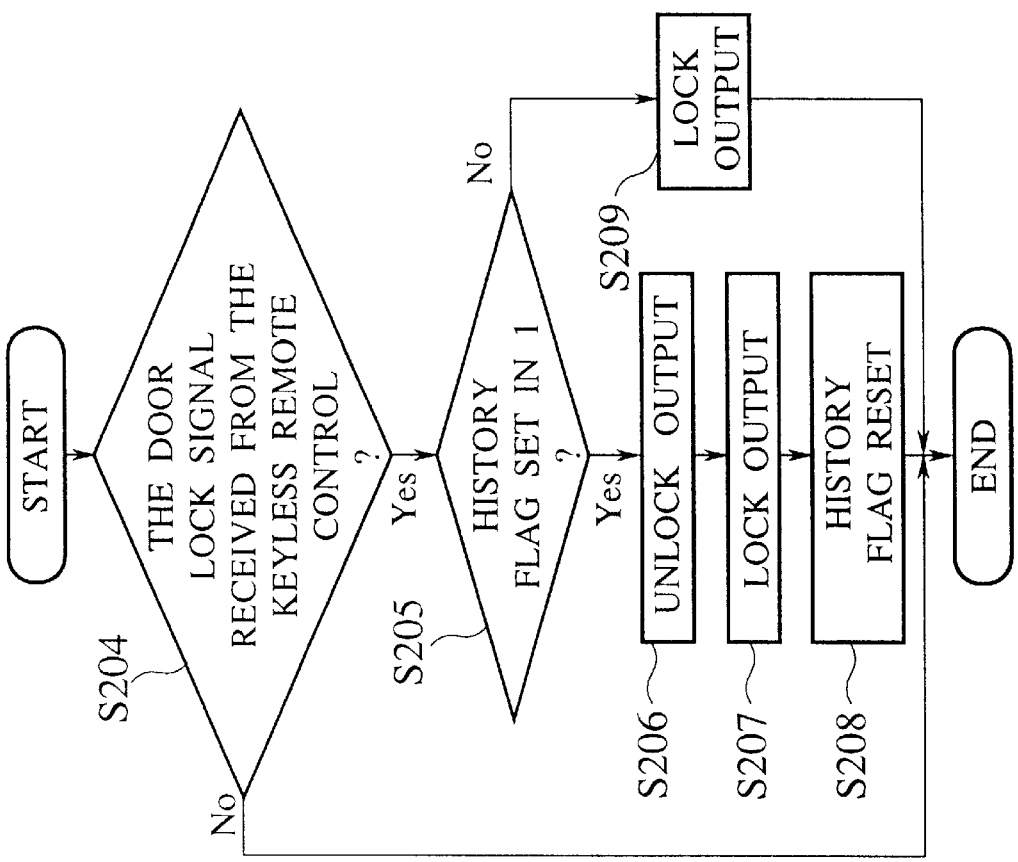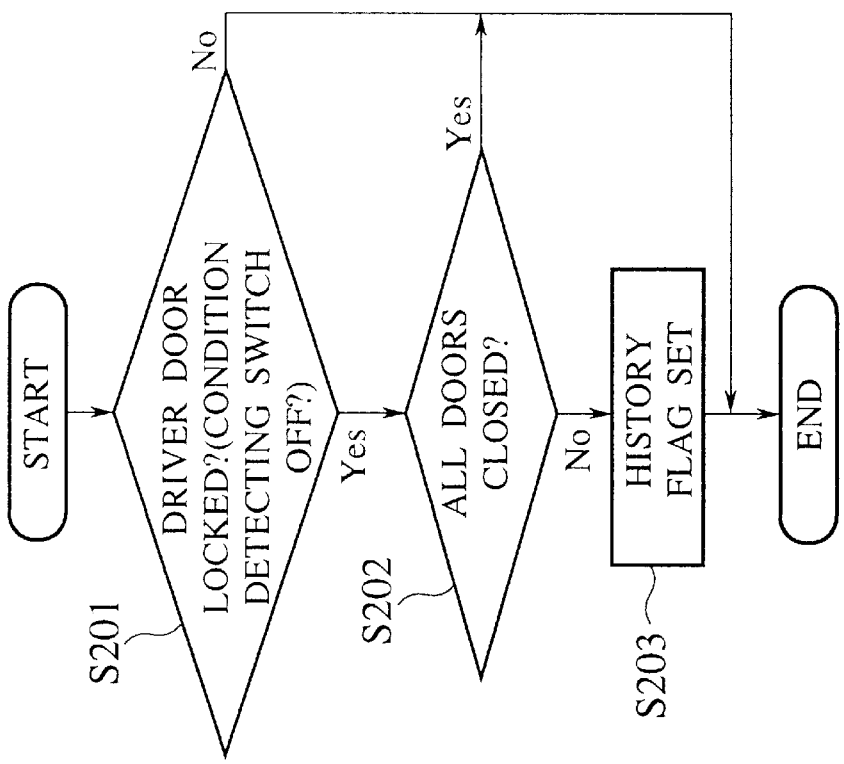

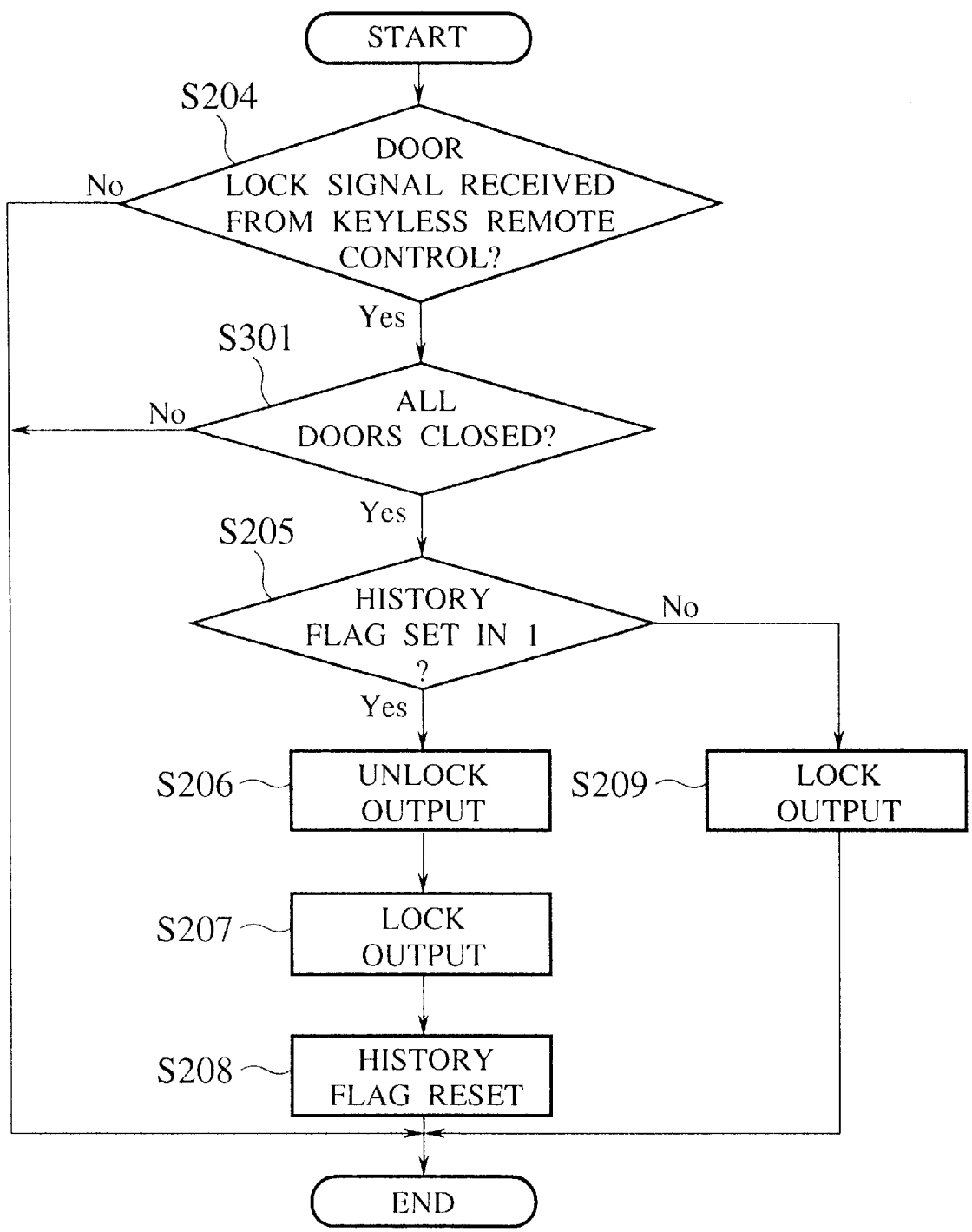

KEYLESS ENTRY SYSTEM

BACKGROUND OF THE INVENTION

The present invention generally relates to a keyless entry system for locking or unlocking a door key of a vehicle by a radio remote controlling operation.

There is known a keyless entry system for locking or unlocking the door of a vehicle, when both the codes agree with each other, by transmission of the code signals from a transmitter (hereinafter referred to as a remote control transmitter) for remote control use to receive them with a receiver mounted on the vehicle and checking with codes peculiar to the vehicle (for example, see Japanese Patent Laid-open NO. 60-37380).

Generally, this type of apparatus unlocks all the doors by the reception of a code signal peculiar to the vehicle when a driver seat door is in a locked condition, and locks all the doors by the reception of a code signal peculiar to the vehicle when the driver seat door is in the unlocked condition.

As shown in FIG. 1, when the driver seat crew gets off and depresses an operation button 1a of the remote control transmitter 1, all the doors 2a through 2d of the vehicle 2 are locked, because the driver seat door 2a is in an unlocked condition. Then, before getting off, a passenger of a rear seat operates the door lock knob inside the vehicle onto the unlocked side to open the left door 2d of the rear seat. When he depresses the button 1a of the remote control transmitter 1 to lock the left door 2a of the rear seat in the unlocked condition, all the doors 2a through 2d are unlocked, because the driver seat door 2a was already in a locked condition.

The conventional keyless entry system has a problem in that all the doors are unlocked if the driver operates the remote control transmitter trying to lock all the doors, the passenger doors were unlocked in the locked condition of all the doors, because all the doors are adapted to be unlocked if the driver seat door is in the locked condition when the code signal peculiar to the vehicle is received from the remote control transmitter, and all the doors are adapted to be locked if the driver seat door is in an unlocked condition.

Also, there is the other keyless entry system shown in, for example, FIG. 2. In such a keyless entry system, the keyless control unit 402 mounted on a vehicle directly drives an door lock actuator 403 of the driver seat when a door lock signal is inputted from the keyless remote control 401 so as to drive the door lock actuator 403 to lock the doors. When the door actuator 403 is driven, the condition detection switch 404 provided within the door lock actuator 403 of the driver seat is switched from ON (unlocked condition detection) to OFF (locked condition detection) so as to output an OFF signal to the door lock timer 405.

The door lock timer 405 drives the door lock actuator 406 of the passenger seats to lock all the door lock actuators 406 when the output of the condition detection switch 404 is switched from the ON signal to the OFF signal.

Namely, the keyless control unit 402 drives the door lock actuator 403 of the driver seat, when the door lock signal is inputted through the keyless remote control 401, to lock the door of the driver seat. The door lock timer 405 is interlocked with the change (ON→OFF) in the output signal of the condition detection switch 404 to drive the door lock actuators 406 of the passenger seats for locking all the doors.

But in the above described control operation, when the door lock actuator 403 of the driver seat is in a locked condition, the door lock signal is inputted through the keyless remote controller 401. If the keyless control unit 402 lock-drives again the door lock actuator 403, the driving operation of the door lock actuator 406 is not carried out by the door lock timer 405, because the output of the condition detection switch 404 is already an ON signal, and the output signal of the condition detection switch 404 does not change (ON→OFF) by another locking operation. Therefore, an inconvenience occurs that the locking of all the doors is not carried out if the driver seat door is locked through the keyless remote control 401.

Concretely, the locked, unlocked condition of each door of the vehicle is shown as in FIG. 3. When, for example, persons are on a driver seat and passenger seats, the driver gets off first and locks the door of the driver seat by rotating a key cylinder using a key, effecting the remote control with the keyless remote control 401 or effecting the operation of the hand lock knob by hand so as to lock the door of the driver seat. When the person on the passenger seats unlocks the door by the operation of the hand lock knob with hand from inside the car, and gets off the vehicle, the locked, unlocked condition of each door of the vehicle is shown as in FIG. 3.

If the driver who is already out of the car effects the door locking operation again with the keyless remote control 401 to lock all the doors, he cannot lock the passenger seats, because the output signal of the condition detection switch 404 does not change as described above. Therefore, the vehicle remains unlocked.

Thus, in order to prevent the vehicle from being left unlocked, the door lock actuator 403 of the driver seat is once unlock-driven, when the door lock signal is inputted from the keyless remote control 401, and then, an inversion control is effected to lock again to change (ON→OFF) in the output signal of the condition detection switch 404. The door lock actuator 406 of the passenger seats is driven with the door lock timer 405 to lock all the doors.

But, according to the conventional keyless entry system, the door lock actuator of the driver seat is unlock-driven every time when the door lock signal is inputted from the keyless remote control, and then the inversion controlling operation is effected to lock again with a problem that the operating sounds of the door lock actuator is bothersome.

SUMMARY OF THE INVENTION

Accordingly, an essential object of the present invention is to provide an improved keyless entry system which is capable of correctly grasping when the vehicle is like to correctly lock or unlock the doors.

Another important object of the present invention is to provide a keyless entry system of the above described type which is adapted to reduce the annoying operating sounds of the door lock actuator with execution of only a necessary inversion control to lock again.

In accomplishing these and other objects, according to one preferred embodiment of the present invention, the present invention is applicable to a keyless entry system comprising:

a plurality of actuators for locking or unlocking a plurality of door locking mechanisms for doors including a driver seat door;

transmitting means with a switch for transmitting a code signal;

receiving means for receiving said code signal from the transmitting means;

judging means for checking the code signal received by the receiving means with a predetermined code peculiar to a vehicle to judge whether or not both of the codes agree with each other;

driver seat door condition detecting means for detecting a locked condition and an unlocked condition of the door locking mechanism of the driver seat door;

door opening/closing detection means for detecting an opened or closed condition of all the doors; and controlling means for unlock-driving all of the actuators when the locked condition of the driver seat door is detected by the driver seat door condition detecting means of the driver seat door in the case where it is judged that both of the codes agree with each other by the judging means, and lock-driving all of the actuators when the unlocked condition of the driver seat door is detected by the driver seat door condition detecting means in the case where it is judged that both of the codes agree with each other by the judging means;

wherein the controlling means lock-drives all of the actuators even when the locked condition of the driver seat door is detected by the driver seat door condition detecting means in the case where it is judged that both of the codes agree with each other by the judging means, in the case where the opened condition of the either door is detected by the door opening/closing detection means after the closed condition of all the doors has been detected by the door opening/closing detection means and the locked condition of the driver seat door has been detected by the driver seat door condition detecting means.

In the keyless entry system in accordance with the present invention, normally in the agreed judgment between the reception code and the set code, the plurality of actuators are unlock-driven when the locked condition of the driver seat door is detected, while the plurality of actuators are lock-driven when the unlocked condition of the driver seat door is detected. But when the opened condition of the either door is detected after the detection of the closed condition of all the doors and the detection of the locked condition of the driver seat door, the plurality of actuators are lock-driven even when the locked condition of the driver seat door is detected in the agreed judgment between the received code and the set code.

In the keyless entry system in accordance with the present invention, controlling means lock-drives all of the actuators even when the locked condition of the driver seat door is detected by the driver seat door condition detecting means in the agreed judgment by the judging means, in the case where the closed condition of all the doors are detected by the door opening, closing detecting means after the closed condition of all the doors is detected by the door opening, closing detecting means and the locked condition of the driver seat door is detected by the driver seat door condition detecting means and then the opened condition of the either door is detected by the door opening, closing detecting means.

In the keyless entry system of the present invention, the opened condition of the either door is detected after the detection of the closed condition of all the doors and the detection of the locked condition of the driver seat door, and then, after the locked condition of the driver seat door is detected, the plurality of actuators are lock-driven even when the locked condition of the driver seat door is detected in the agreed judgment between the received code and the set code.

In the keyless entry system in accordance with the claim 3, the controlling means prohibits the operation of all of the actuators even in the agreed judgment by the judging means, in the where the closed condition of all the doors is not detected by the door opening, closing detecting means after the detection of the closed condition of all the doors by the door opening, closing detecting means and the detection of the locked condition of the driver seat door by the driver seat door condition detecting means and then the opened condition of either door by the door opening, closing detecting means is detected.

In the keyless entry system of the present invention, after the opened condition of the either door is detected after the detection of the closed condition of all the doors and the detection of the locked condition of the driver seat door, the opened condition of the either door is detected, and then, the operation of the plurality of actuators is prohibited even in the agreed judgment between the received code and the set code when the closed condition of all the doors has not been detected.

The keyless entry system in accordance with the present invention comprises:

a keyless remote control for keyless entry use, the remote control transmitting a door locking signal indicative to lock the doors of the vehicle;

a plurality of door locking actuators that are arranged for each of a driver seat door and a passenger seat door of the vehicle to lock and unlock each door;

a locking/unlocking condition detecting switch for detecting whether the door actuator of the driver seat door is in a locked condition or an unlocked condition; and a controlling unit for driving the door locking actuator of the driver seat door to lock the driver seat door when the door locking signal is inputted through the keyless remote control, the controlling unit also driving the door locking actuator of the passenger seat door to lock the passenger seat door corresponding to the detection of the locked condition by the locked/unlocked condition detecting switch a plurality of door switches for detecting whether or not all the doors of the vehicle are closed;

history flag setting means for setting a history flag when the door locking actuator of the driver seat door is in the locked condition and the either door of the vehicle is in the opened condition according to the detected results of the locking/unlocking condition detecting switch and the door switches; and said controlling unit lock-driving the door lock actuators of all the doors after once unlocking the door lock actuators, wherein when the history flag is set and when the door locking signal is inputted through the keyless remote control B8 and resets the history flag.

Also, the keyless entry system in accordance with the present invention, the control unit inputs the detected results of the plurality of door switches when the door lock signal is inputted from the keyless remote control, judges whether or not the either door of the vehicle is open, and prohibit the operation by the door lock signal when the either door of the vehicle is open.

In the keyless entry system of the present invention, the history flags are set by the history flag setting means when the door lock actuators of the driver seat is lock-driven in condition and either door of the vehicle is opened. Then, when the door lock signals are inputted to the control unit through the keyless remote control, the control unit judges whether or not the history flag is set. After the door lock actuators of all the seats are once unlock-driven only when the history flag is set, the condition is locked and also, the history flag is reset. Accordingly, only in the locked condition of the door lock actuators of the driver seat and the opened condition of the either door of the vehicle, the inversion control operation can be carried out.

Also, in the keyless entry system of the present invention, the control means judges whether or not the either door of the vehicle is open in accordance with the detected results of the plurality of door switches when the door lock signal is inputted from the keyless remote control. When the either door of the vehicle is open, the operation by the door lock signal is prohibited. Thus, the driver can know it from the either opened door of the vehicle, because the door is inoperative.

BRIEF DESCRIPTION OF THE DRAWINGS

These and other objects and features of the present invention will become apparent from the following description of the preferred embodiment thereof with reference the accompanying drawings, in which:

FIGS. 8A, 8B show controlling flow charts in the second embodiment, FIG. 8A being a flow chart of a history flag setting process, FIG. 8B being a flow chart of a door locking process by a door locking signal from the keyless remote control; and FIG. 9 is the controlling flow chart in a modified example of the second embodiment.

DESCRIPTION OF THE PREFERRED EMBODIMENT

Figure 1:
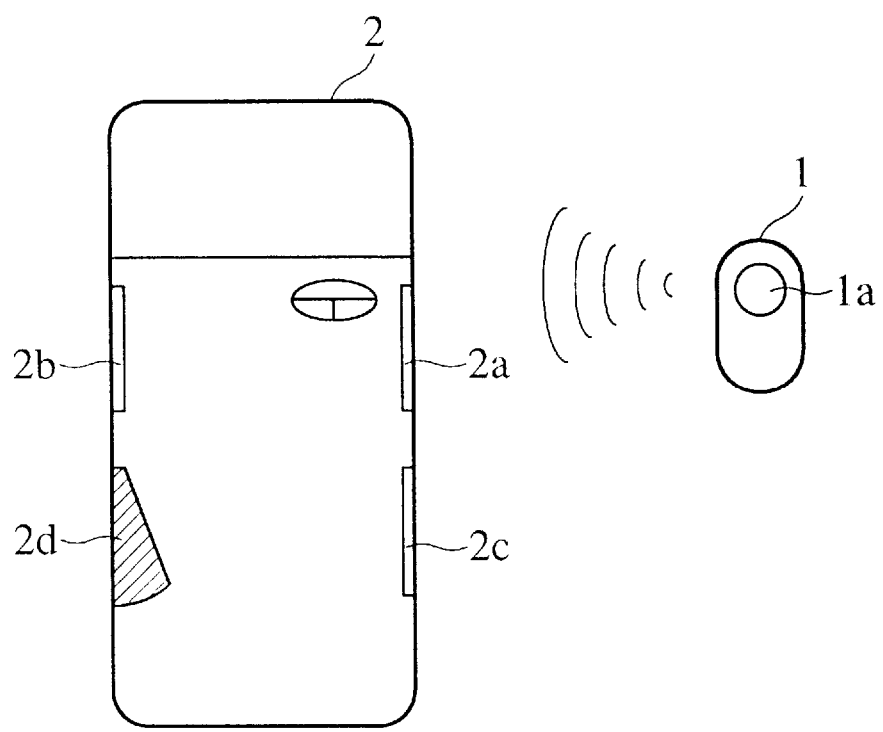
FIG. 1 is a view showing a remote control transmitter and a vehicle common to both the conventional keyless entry system and a first embodiment of the present invention.
Figure 2:
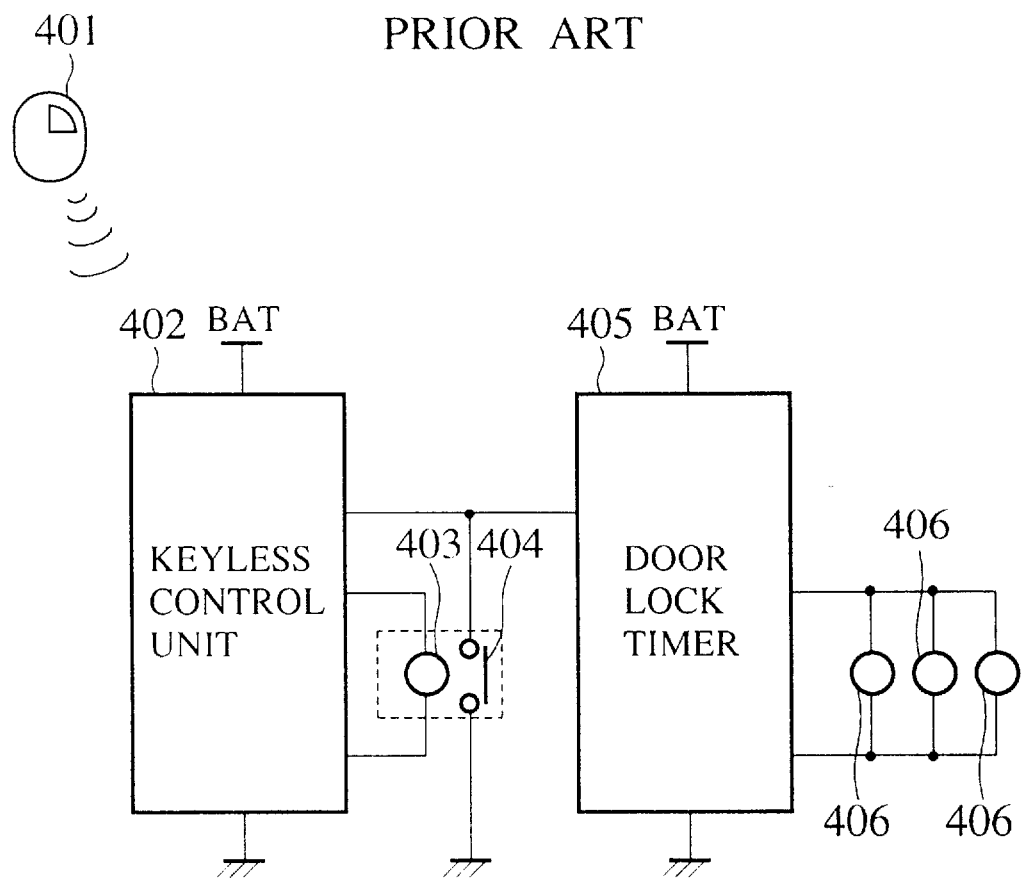
FIG. 2 is a view for illustrating the construction of the conventional keyless entry system.
Figure 3:
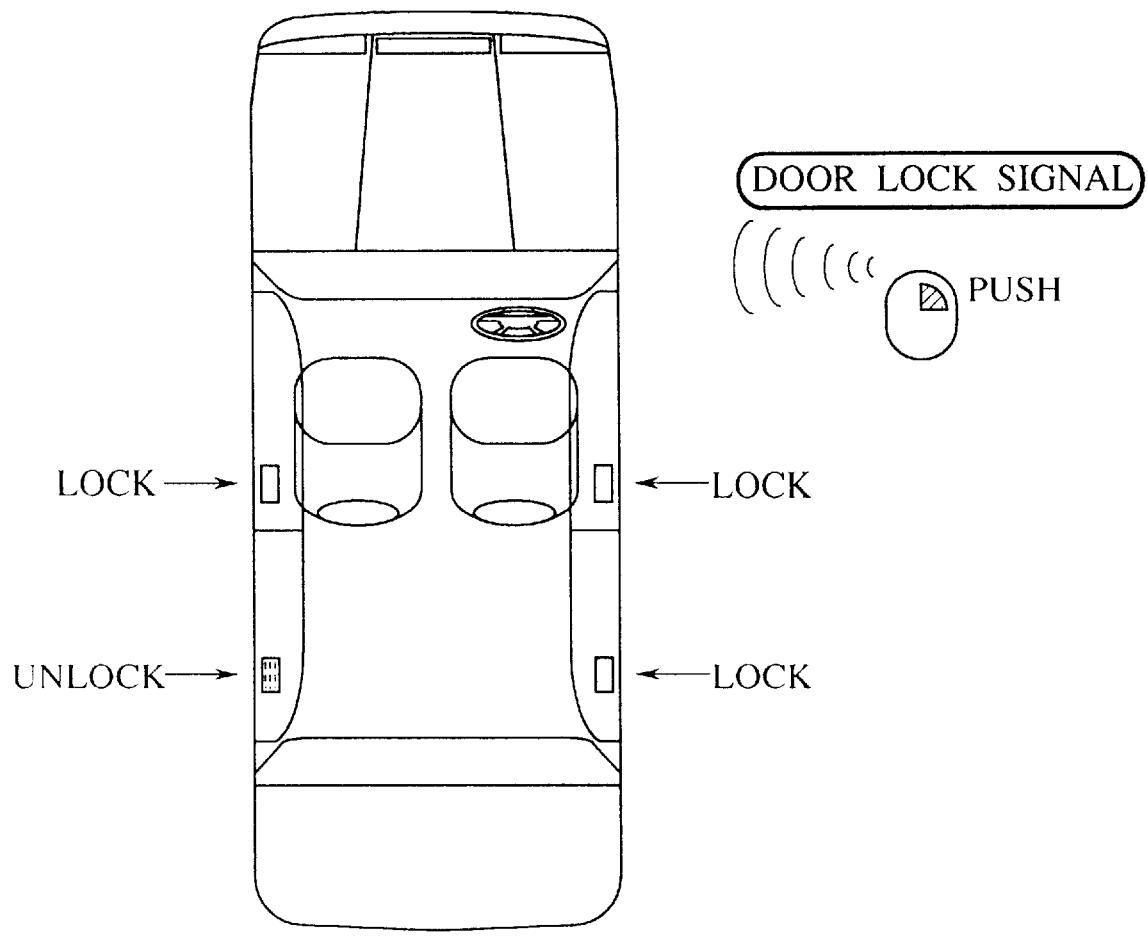
FIG. 3 is a view for illustrating the conventional problems.

Before the description of the present invention proceeds, it is to be noted that like parts are designated by like reference numerals throughout the accompanying drawings.

Figure 4:
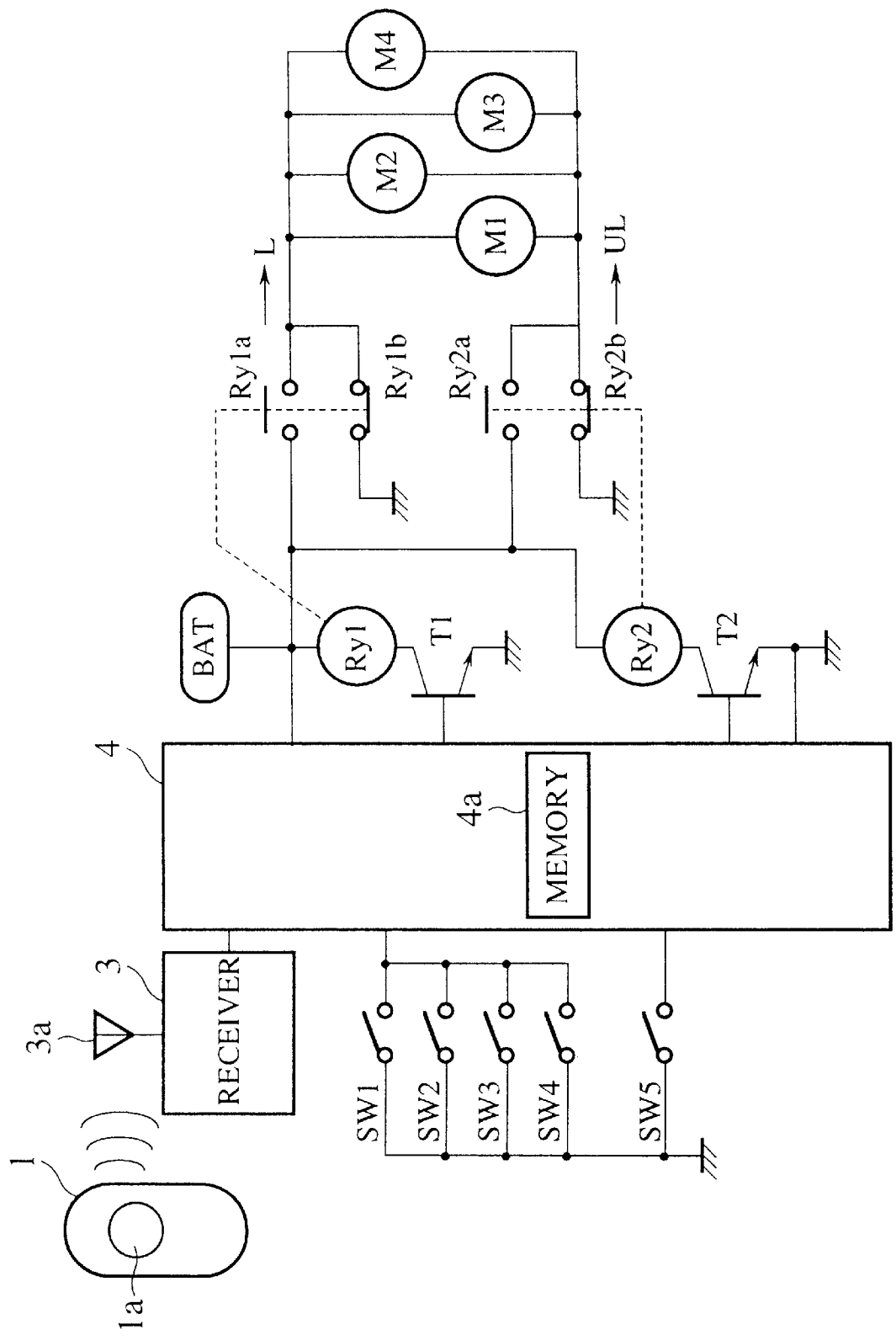
FIG. 4 is an electric circuit diagram showing the construction of a first embodiment of the present invention.

Referring now to the drawings, FIG. 1 shows a remote control transmitter and a vehicle, and FIG. 4 shows an electric circuit diagram showing the construction according to a first preferred embodiment of the present invention.

A remote control transmitter 1 is an apparatus for locking or unlocking the door of the vehicle 2 by a remote operation. The remote control transmitter 1 has a single push button 1a for locking or unlocking the door. When a push button 1a is depressed, a signal radio wave including a code peculiar to a vehicle is transmitted from the remote control transmitter 1. In the embodiment, a code peculiar to the vehicle 2 is to be memorized in advance in the remote control transmitter 1. The code signal transmitted from the remote control transmitter 1 is received with an antenna 3a of a transmitter mounted in the vehicle 2. The code of the vehicle 2 is demodulated and fed to the controller 4.

The controller 4, composed of peripheral components such as microcomputer, memory 4a and so on, execute a controlling program to be described to effect locking, unlocking control operation of the doors 2a through 2d of the vehicle 2. The code peculiar to the vehicle 2 is memorized in advance in the memory 4a to compare the memory code with the code transmitted from the remote control transmitter 1 and effects a locking or unlocking operation of the door 2a through 2d of the vehicle 2 when both codes are agreed.

Door switches SW1 through SW4 are respectively the opening detection switches of a driver seat door 2a, an assistant seat door 2b, a rear seat right door 2c and a rear seat left door 2d. The door is opened and the switch of the door is closed in circuit. As the door switches SW1 through SW4 are connected in parallel, the controller 4 can recognize only a condition where all the doors are closed and a condition where either door is open.

The lock switch SW5 is a switch for detecting the locked condition of the driver seat door 2a and is closed when the driver set door 2a is locked.

Actuators M1 through M4 are respectively actuators for locking, unlocking the door locking mechanisms not shown for a driver seat door 2a, an assistant seat door 2b, a rear seat right door 2c, a rear seat left door 2d. When the current flows (hereinafter referred to as lock current) in the L direction shown, each door is locked. When the current (hereinafter referred to unlock current) flows in the UL direction shown, each door is unlocked.

A lock relay Ry1 and an unlock relay Ry2 are the relays which flow the locking or unlocking current to the actuators M1 through M4 to operate the actuators M1 through M4 onto a locking or unlocking side. The lock relay Ry1 is energized and the unlock relay Ry2 is not when a transistor T1 is turned on a transistor T2 is turned off by the controller T1. At this time, the locking current flows along the route of the battery BAT→the contact Ry1a of the relay Ry1→the actuators M1 through M4→the contact Ry2b of the relay Ry2→the earth for operating the actuators M1 through M4 onto the locking side.

On the other hand, the unlock relay Ry2 is energized and the lock relay is not when the transistor T2 is turned on and the transistor T1 is turned off by the controller 4. At this time, the unlocking current flows along the route of the battery BAT→the contact Ry2a of the relay Ry2→the actuators M1 through M4→the contact Ry1b of the relay Ry1→the earth for operating the actuators M1 through M4 onto the unlocking side.

Figure 5:
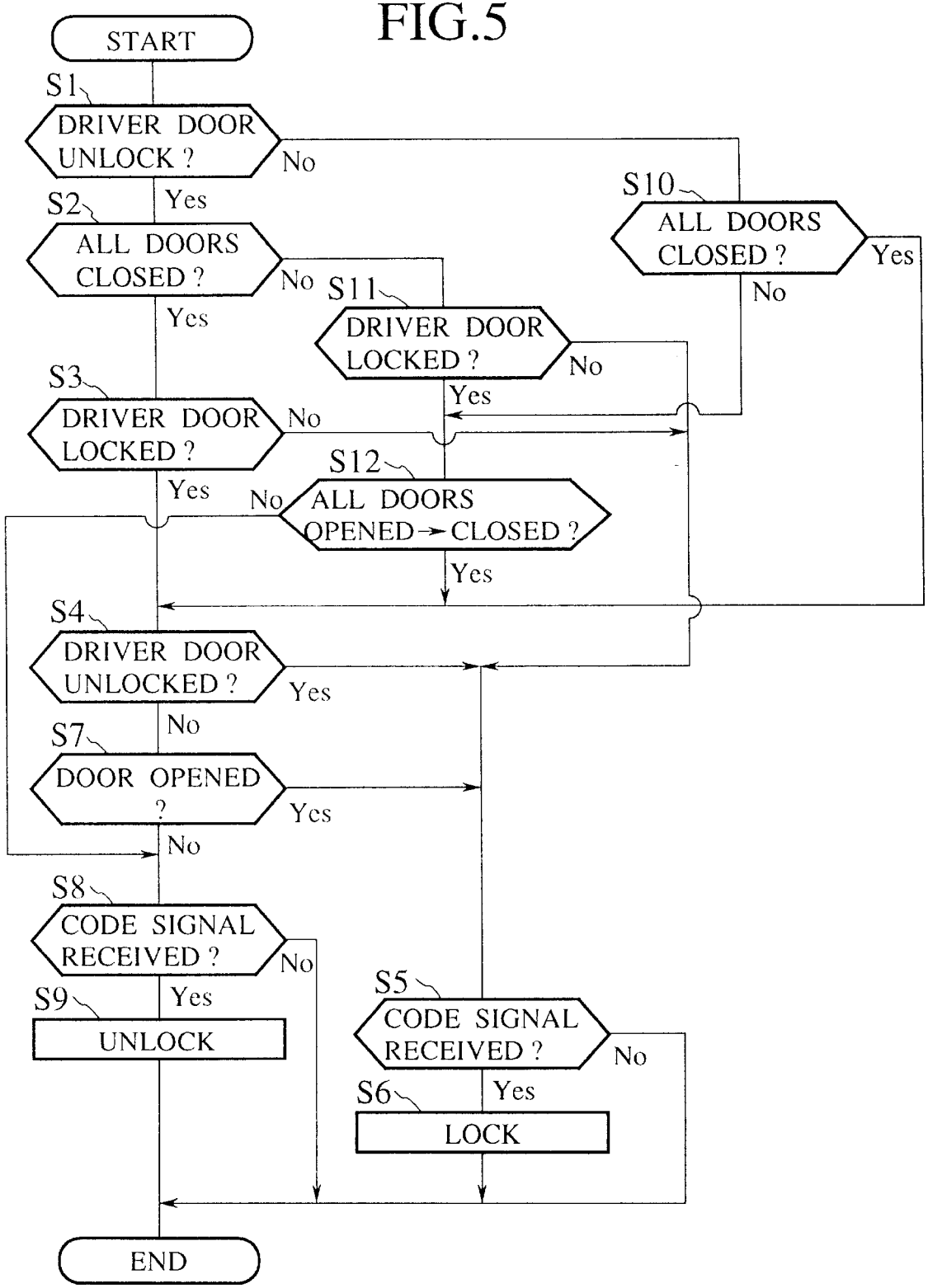
FIG. 5 is a flow chart showing the locking/unlocking control operation of the first embodiment.

FIG. 5 is a flow chart showing the locking/unlocking controlling operation in one embodiment. The operation is as follows:

(1) In the case of the unlocked condition of the driver seat door 2a and the closed position of all the doors 2a through 2d, the actuators M1 through M4 are lock-drive, when the code signal peculiar to the vehicle is received, to lock all the doors 2a through 2d (S1→S2→S3→S5→S6, S1→S2→S3→S5→S6 and so on in FIG. 5).

(2) When at least one of the doors 2a through 2d is opened during both the closed condition of all the doors 2a through 2d and the locked condition of the driver seat door 2a, it is judged that after the driver got off to lock all the doors the crew remaining within the car unlocked the door with the lock knob, opened the door and got off. When the code signal peculiar to the vehicle was received, the actuators M1 through M4 are driven to lock all the doors 2a through 2d even if the driver door 2a is in a locked condition (S1→S2→S3→S4→S7→S5→S6 and so on in FIG. 5).

(3) In the locked condition of the driver seat door 2a and the closed condition of all the doors 2a through 2d, the actuators M1 through M4 are unlock-driven, when the code signal peculiar to the vehicle is received, to lock all the doors 2a through 2d (S1→S2→S3→S4→S7→S8→S9 and so on in FIG. 5).

As described above, if the other persons got off the vehicle from the passenger door except the driver seat in the closed condition of all the doors and the locked condition of the driver seat door, all the doors are positively locked by the remote controlling operation, i.e. depressing the push button 1a and the correct locking or the unlocking operation of the doors with the correct understanding of the condition of the vehicle.

A modified example of the first embodiment will be described herein after.

In the above described embodiment, all the doors are to be locked if the driver seat door is in the locked condition when the code signal peculiar to the vehicle is received in a case where the passenger remaining within the car got off from the door except for the driver seat in the locked condition of the driver seat door with all the doors being closed. In such a case, the door locking operation by the remote operation may be allowed to effect when all the doors are closed. The locking/unlocking operations of the door by the remote control may be prohibited from being effected when all the door are not in the closed condition.

Figure 6:
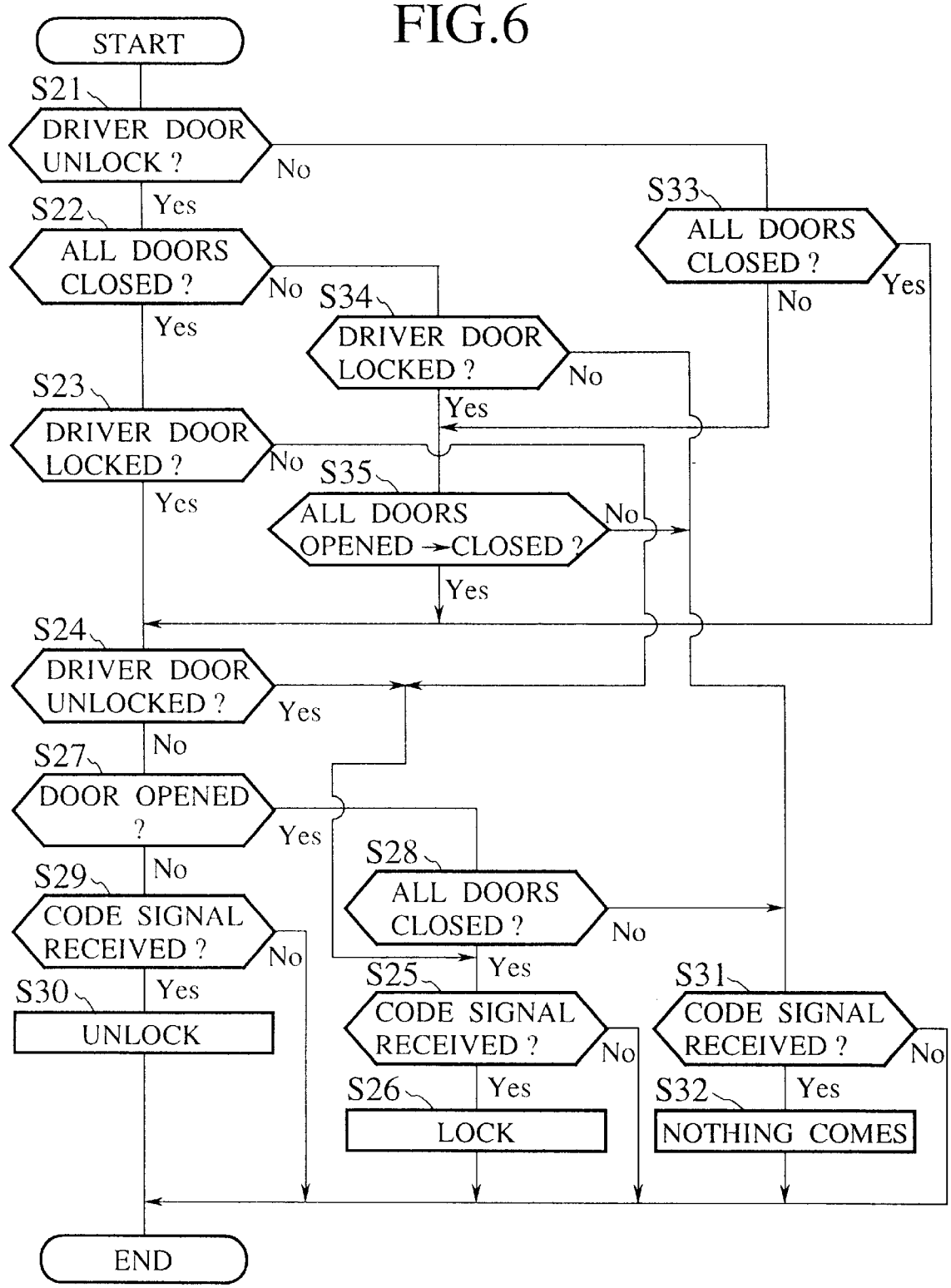
FIG. 6 is a flow chart showing the locking/unlocking control operation of the modified example of the first embodiment.

FIG. 6 is a flow chart showing the modified example in the above described embodiment.

(1) In the case of the unlocked condition of the driver seat door 2a and the closed condition of all the doors 2a through 2d, the actuators M1 through M4 are lock-driven, when the code signal peculiar to the vehicle, to lock all the doors 2a through 2d (S21→S22→S23→S24→S25→S26, S21→S22→S23→S25→S26 and so on in FIG. 6).

(2) When at least one of the doors 2a through 2d is opened during both the closed condition of all the doors 2a through 2d and the locked condition of the driver seat door 2a, it is judged that after the driver got off to lock all the doors, when all the doors 2a through 2d have been closed, the crew remaining within the car unlocked the door with the lock knob, opened the door and got off. When the code signal peculiar to the vehicle was received, the actuators M1 through M4 are driven in the locked condition of the driver seat door 2a to lock all the doors 2a through 2d even if the driver seat door 2a is in a locked condition (S21→S22→S23→S24→S27→S28→S25→S26 and so on in FIG. 6).

(3) When either of the doors 2a through 2d remains opened after the closed condition of all the doors 2a through 2d and the locked condition of the driver seat door 2a are detected, nothing comes if the code signal peculiar to the vehicle is received (S21→S22→S23→S24→S27→S28→S31→S32 and so on in FIG. 6).

(4) When the code peculiar to the vehicle is received in the locked condition of the driver seat door 2a and the closed condition of all the doors 2a through 2d, actuators M1 through M4 are unlock-driven and all the doors 2a through 2d are unlocked (S21→S22→S23→S24→S29→S30 and so on in FIG. 6).

When the crew remaining within the car got off from the door except for the driver seat in the locked condition of the driver seat door with all the doors closed, the door lock is permitted by the remote control. And the locking/unlocking operation of the door is prohibited by the remote control when all the doors remain open. Even when the persons got off from the passenger door in the closed condition of all the doors and the locked condition of the driver seat door, the person can correctly grasp the condition of the vehicle and the locking or unlocking operation of the correct door can be effected.

In the construction of the above described embodiment, the actuators M1 through M4 compose the actuator, the remote control transmitter 1 composes the transmitting means, the transmitter 3 and the antenna 3a compose the receiving means, the controller 4 compose the judging means and the control means, the driver seat door lock condition detection switch SW5 compose the driver seat door condition detecting means, the door opening detecting switches SW1 through SW4 compose the door opening, closing detecting means.

Subsequently, description will be made with reference to the drawing about the second embodiment of the keyless entry system of the invention.

Figure 7:
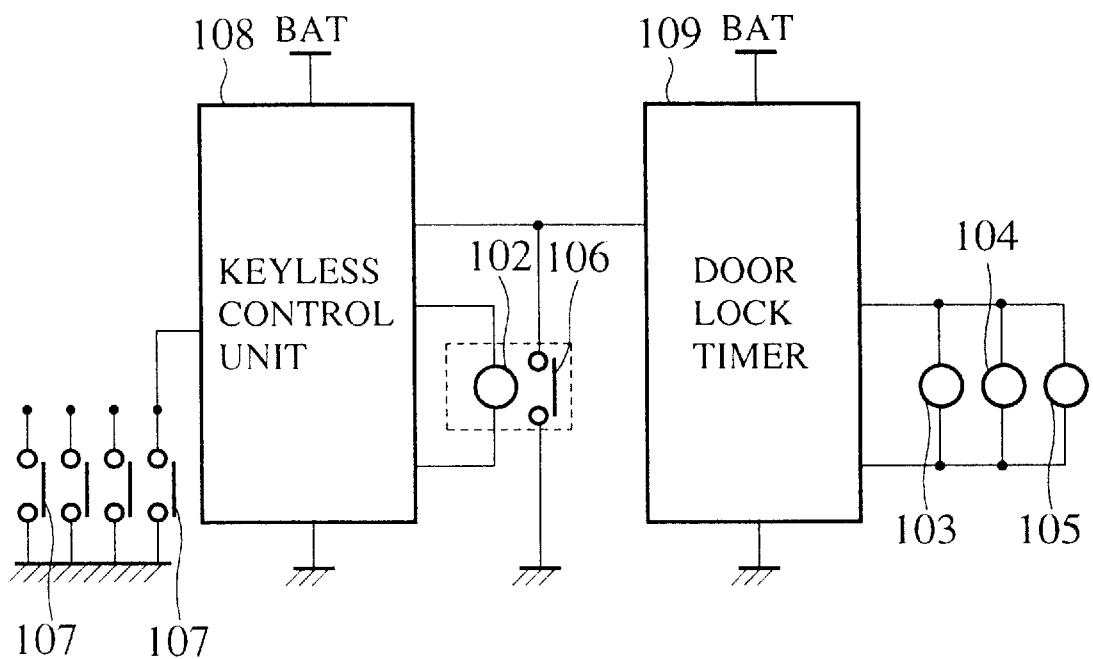
FIG. 7 is a diagram for illustrating the construction of the keyless entry system in a second embodiment of the present invention.

FIG. 7 shows the construction of the keyless entry system in the present embodiment, which is composed of a keyless remote control 101 which is a transceiver for the keyless entry use, a drop actuator 102 for locking, unlocking of the door of the driver door, door lock actuators 103, 104, 105 for locking, unlocking of the passenger doors, a condition detecting switch 106 for detecting the locked, unlocked condition of the door lock actuator 102 of the driver seat door, a plurality of door switch 107 disposed for each door for detecting whether or not all the doors of the vehicle are closed, a keyless control unit 108 for controlling the drive of the door lock actuator 102 of the driver set when the door lock signal is inputted through the keyless control 101, and door lock timer 109 for interlocking the detection results of the condition detection switch 106 and driving the door lock actuators 103 through 105 of the passenger doors to lock the passenger doors.

It is to be noted that the controlling apparatus of the invention is composed of the above described keyless control unit 108 and the door lock timer 109. Also, the keyless control unit 108 achieves the role of the history flag setting means of the invention.

Further, the plurality of door switches 107 respectively output the OFF signal when the corresponding doors are closed and output the ON signal when open. When either door is open the ON signal is outputted from the either door switch 107 into the keyless control unit 108, the OFF signal is adapted to be inputted when all the doors are closed.

In the above described construction, the operation will be described with reference to the control flow chart of the keyless entry system in the present embodiment.

First, the history flag setting process will be described with reference to the control flow chart of FIG. 8A. At the step S201, the keyless control unit 108 judges whether or not the driver door is locked in accordance with the ON, OFF condition of the condition detecting switch 106. When the driver door is in the locked condition, the detection switch 106 is OFF, and when it is in the unlocked condition the detection switch 106 is ON. When affirmative, the step advances to the step S202, while the step completes the processing in the case of the negative.

At the step S202, in the locked condition of the door at the driver seat, it is judged whether or not all the doors are closed by whether the input signal inputted to the keyless control unit 108 from the plurality of door switch 107 is the ON signal or the OFF signal. When affirmative, the processing is completed. When negative, the step advances to the step S203.

At the step S203, the history flag is set ("1" is set) to complete the processing in the locked condition of the driver seat door and the opened condition of either door.

The "1" is set in the history flag in the locked condition of the door lock actuator 102 of the driver seat door and the opened condition of either door of the vehicle by the processing of the above described step S201 through S203.

The door locking processing by the door lock signal from the keyless remote control 101 will be described hereinafter with reference to the control flow chart of FIG. 8B. First, at the step S204, it is judged whether or not the door locking signal from the keyless remote control 101 is received, and the processing is completed unless the door locking signal is received.

At the step S205, it is judged whether or not the "1" is set in the history flag if the door locking signal is received. When set, the step advances to the step S206. When not set, the step advances to the step S209.

At the step S206, the keyless control unit 108 effects the unlocking output to the door locking actuator 102 of the driver seat to once unlock the door of the driver seat. Then, at the step S207, the keyless control unit 108 effects the locking output to the door locking actuator 102 of the driver seat to lock the door of the driver seat. At the step S208 the history flag is reset ("0" is set) to complete the processing. At this time, the output of the condition detecting switch 106 is also changed into OFF from ON by the change into the lock from the unlock of the door locking actuator 102. Accordingly, the door locking timer 109 drives the door locking actuators 103 through 105 of the passenger doors in accordance with change of ON→OFF in the output of the condition detecting switch 106.

When the "1" is not set in the history flag at the step S205, the operation of the door locking timer 109 is prohibited at the step S209. At the step S207, S209, the keyless control unit 108 effects the locking outputs to the door locking actuator 102 of the driver seat door to lock only the door of the driver seat for completing the processing.

In other words, in the present embodiment, when the door lock signal is inputted through the keyless remote control 101 only in the locked condition of the door locking actuator of the driver seat door and the opened condition of the either door of the vehicle, the door lock actuators 102 through 105 of all the doors are once unlock-driven, and then the inversion control for making the condition locked is effected. Also, when the reversion control for making the condition locked is not necessary to effect after the condition has once been made unlocked like the unlocked condition of the driver seat and the closed condition of all the doors, the processing is completed only by the locking of the driver seat. Therefore, the reversion control operation is carried out only when necessary so that the bother of operating sounds of the door locking actuators 102 through 105 can be reduced.

Also, in the modified embodiment of the present embodiment, the unlocking of the vehicle can be positively avoided by the prohibition of the operation with the door locking signal by the keyless remote control 101 when the either of the doors is open. FIG. 9 shows the control flow chart of a case where the door locking by the keyless remote control 101 is prohibited at the opened door, which is basically an addition of the step S301 to the control flow chart of FIG. 8B. Here is explained only the different portions.

At the step S301, whether or not all the doors are closed is judged by whether the input signal inputted to the keyless control unit 108 from the plurality of door switches 107 is an ON signal or an OFF signal. When either door is opened, the processing is completed as it is. When all the doors are closed, the step advances to the step S205.

As is clear from the foregoing description, according to the arrangement of the present invention, when the door lock signal is inputted from the keyless remote control 101 like this, the keyless control unit 108 judges whether or not either of the doors is open in accordance with the detection result of the plurality of door switch 107. When either of the vehicle is opened, the operation by the door locking door is not carried out (namely, prohibited) so that the driver can know the opening condition of the either door of the vehicle, because the door lock is inoperative. Also, the neglected unlocked condition can be avoided with the either door being opened.

Although the present invention is fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A keyless entry system for a vehicle comprising:
   a plurality of actuators for locking and unlocking a plurality of door locking mechanisms for doors including a driver seat door;
   transmitting means with a switch for transmitting a code signal;
   receiving means for receiving said code signal from the transmitting means;
   judging means for checking the code signal received by the receiving means with a predetermined code peculiar to a vehicle to judge whether or not both of the codes agree with each other;
   driver seat door condition detecting means for detecting a locked condition and an unlocked condition of the door locking mechanism of the driver seat door;
   door opening/closing detection means for detecting an opened or closed condition of all the doors; and
   controlling means for unlock-driving all of the actuators when the locked condition of the driver seat door is detected by the driver seat door condition detecting means of the driver seat door in a case where it is judged that both of the codes agree with each other by the judging means, and lock-driving all of the actuators when the unlocked condition of the driver seat door is detected by the driver seat door condition detecting means in a case where it is judged that both of the codes agree with each other by the judging means;
   wherein the controlling means lock-drives all of the actuators, even when the locked condition of the driver seat door is detected by the driver seat door condition detecting means in the case where it is judged that both of the codes agree with each other by the judging means, in the case where the opened condition of any of the doors is detected by the door opening/closing detecting means after the closed condition of all the doors has been detected by the door opening/closing detection means and the locked condition of the driver seat door has been detected by the driver seat door condition detecting means.

2. A keyless entry system as claimed in the claim 1, wherein the controlling means lock-drives all of the actuators even when the locked condition of the driver seat door is detected by the driver seat door condition detecting means in the case where it is judged that both of the codes agree with each other by the judging means, in the case where the closed condition of all the doors are detected by the door opening/closing detection means after the closed condition of all of the doors is detected by the door opening/closing detecting means and the locked condition of the driver seat door has been detected by the driver seat door condition detecting means and then the opened condition of the any of the doors is detected by the door opening/closing detecting means.

3. A keyless entry system as claimed in claim 1, wherein the controlling means prohibits the operation of all of the actuators, even in the case that it is judged that both of the codes agree with each other by the judging means, in the case where the closed condition of all the doors is not detected by the door opening/closing detecting means after the detection of the closed condition of all the doors by the door opening/closing detecting means and the detection of the locked condition of the driver seat door by the driver seat door condition detecting means and then the opened condition of the any of the doors by the door opening/closing detecting means is detected.

4. A keyless entry system for a vehicle comprising:
a keyless remote control for keyless entry use, the remote control transmitting a door locking signal which is used to lock the doors of the vehicle;
a plurality of door locking actuators that are arranged for each of a driver seat door and a passenger seat door of the vehicle to lock and unlock each door;
a locking/unlocking condition detecting switch for detecting whether the door locking actuator of the driver seat is in a locked condition or an unlocked condition; and
a controlling unit for driving the door locking actuator of the driver seat door to lock the driver seat door when the door locking signal is inputted through the keyless remote control, the controlling unit also driving the door locking actuator of the passenger seat door to lock the passenger seat door corresponding to the detection of the locked condition by the locked/unlocked condition detecting switch;
a plurality of door switches for detecting whether or not all the doors of the vehicle are closed;
history flag setting means for setting a history flag when the door locking actuator of the driver seat door is in the locked condition and the either door of the vehicle is in the opened condition according to the detected results of the locking/unlocking condition detecting switch and the door switches; and
said controlling unit lock-driving the door lock actuators of all the doors after once unlocking the door lock actuators, when the history flag is set and when the door locking signal is inputted through the keyless remote control, and resets the history flag.

5. A keyless entry system as claimed in the claim 4, wherein the controlling unit judges whether or not the either door of the vehicle is open according to the detected result of the plurality of door switches when the door locking signal is inputted from the keyless remote control, and prohibits a locking operation of the door lock actuators by the door lock signal when the either door of the vehicle is opened.

6. A keyless entry system as claimed in claim 2, wherein the controlling means prohibits the operation of all of the actuators even in the agreed judgment by the judging means, in the case where the closed condition of all the doors is not detected by the door opening, closing detecting means after the detection of the closed condition of all the doors by the door opening, closing detecting means and the detection of the locked condition of the driver seat door by the driver seat door condition detecting means and the opened condition of either door by the door opening, closing detecting means is detected.

7. A door lock control system for a vehicle having a plurality of doors, comprising:
a first door having a first locking mechanism;
a second door having a second locking mechanism;
a signal generator to generate a signal to lock and unlock the first and the second door;
a lock sensor to detect whether the first door is locked or unlocked;
a door sensor to detect whether both of the first and the second doors are closed; and
a controller for locking and unlocking the first and the second door by driving the first and the second locking mechanisms according to the detection of the lock sensor and the door sensor when the signal from the signal generator is input,
the controller locking the first and the second doors when the first door is unlocked, or when the second door is opened and the first door is locked after the first and the second door is once closed and the first door is locked, and unlocking the first and the second doors when the first and the second doors stay closed after the first and the second doors are closed and the first door is locked.

8. The door lock control system as defined in claim 7, wherein
the controller locks the first and the second doors, when the signal is input, and when the first and the second doors are closed and the first door is locked at first, after that the second door is opened and the first door is locked and still later the first and the second doors are closed.

9. The door lock control system as defined in claim 7, wherein
the controller maintains that the first and the second door is locked or unlocked when the second door is opened after the first and the second doors are closed and the first door is locked.

10. The door lock control system as defined in claim 7, wherein
the controller prevents the door from being locked when at least one of the first and the second doors opens.

11. The door lock control system as defined in claim 7, wherein the signal generator comprises:
a transmitter for transmitting an identifier code;
a receiver disposed in a vehicle to receive the identifier code transmitted from the transmitter; and
a comparator for comparing the identifier code received by the receiver with a predetermined code peculiar to the vehicle, the comparator outputting the signal when the identifier code is identical to the predetermined code.

12. The door lock control system as defined in claim 11, wherein
the transmitter has an operation device, and transmits the identifier code in response to the operation of the operation device.

13. The door lock control system as defined in claim 7, wherein
the first door is a driver seat door.

14. The door lock control system as defined in claim 7, wherein the second door is a passenger seat door.

15. A door lock control system for a vehicle having a plurality of doors, comprising:

a first door including a first locking mechanism therein, the first locking mechanism placing the first door in one of a locked condition and an unlocked condition;

a second door having a second locking mechanism;

a signal generator to output a signal indicative to lock the first and the second doors;

a lock sensor to detect whether the first door is in the locked condition or the unlocked condition;

a door sensor to detect whether the first and the second doors are closed respectively; and a controller connected to the lock sensor and the door sensor to judge whether the first door is locked or whether the doors are closed, the controller locking the first door in response to the signal from the signal generator, and locking the first door after locking the first door once when the signal is generated after the first door is locked and the second door is opened, and locking the second door when the first door turns to the locked condition from the unlocked condition.

16. The door lock control system as defined in claim 15, wherein the controller prevents the door from being locked in response to the signal when at least one of the first and the second door are opened.

17. The door lock control system as defined in claim 15, wherein, the signal generator comprises a remote controller which transmits the signal to the controller.

18. The door lock control system as defined in claim 15, wherein the remote controller comprises a switch for transmitting the signal corresponding to an operation of the switch.

19. The door lock control system as defined in claim 15, wherein the first door contains a driver seat door.

20. The door lock control system as defined in claim 15, wherein the second door contains a passenger seat door.

* * * * *